(12) United States Patent
Gerrard

(10) Patent No.: US 7,832,750 B2
(45) Date of Patent: Nov. 16, 2010

(54) ARM FOR A MOTOR-VEHICLE INDEPENDENT SUSPENSION AND MOTOR-VEHICLE INDEPENDENT SUSPENSION COMPRISING THE SAME

(75) Inventor: Miles Barnaby Gerrard, Copenhagen (DK)

(73) Assignee: Sistemi Sospensioni S.p.A., Corbetta (Milano) (IT)

( * ) Notice: Subject to any disclaimer, the term of this patent is extended or adjusted under 35 U.S.C. 154(b) by 20 days.

(21) Appl. No.: 12/295,846

(22) PCT Filed: Mar. 30, 2007

(86) PCT No.: PCT/IB2007/051152

§ 371 (c)(1),
(2), (4) Date: Oct. 2, 2008

(87) PCT Pub. No.: WO2007/113761

PCT Pub. Date: Oct. 11, 2007

(65) Prior Publication Data

US 2009/0184484 A1    Jul. 23, 2009

(30) Foreign Application Priority Data

Apr. 3, 2006    (IT) .......................... TO2006A0246

(51) Int. Cl.
*B60G 7/00*    (2006.01)
(52) U.S. Cl. .................... 280/124.134; 280/124.144
(58) Field of Classification Search .......... 280/124.134, 280/124.135, 124.137, 124.138, 124.143, 280/124.144, 124.15
See application file for complete search history.

(56) References Cited

U.S. PATENT DOCUMENTS 2,153,168 A  *  4/1939  Broadman ........... 280/124.134

(Continued)

FOREIGN PATENT DOCUMENTS

DE          758 202 C    4/1954

(Continued)

*Primary Examiner*—Paul N Dickson
*Assistant Examiner*—Timothy D Wilhelm
(74) *Attorney, Agent, or Firm*—Sughrue Mion, PLLC

(57) ABSTRACT

The arm (12) comprises a pair of transverse rods (16, 18) articulated at their outer ends (24, 28) to the wheel-carrier of a vehicle wheel and at their inner ends (26, 30) to the vehicle body, and at least one pair of connecting elements (20, 22) which connect the rods (16, 18) to one another and are preferably formed as blade-like or plate-like elements, in such a manner that their bending stiffness in a plane is higher than their bending stiffness in a direction perpendicular to that plane. The arm (12) is capable of controlling two translational degrees of freedom (DOFx, DOFy) along the axes of the rods (16, 18) and, by virtue of the geometry and torsional stiffness of the rods (16, 18), as well as of the geometry and bending stiffness of the connecting elements (20, 22) in their plane, a first rotational degree of freedom (DOFθy) about a first, mainly transverse and horizontal axis (ESAy). According to the invention, the rods (16, 18) converge, preferably towards the outside of the vehicle, in such a manner that the arm has an elastic centre (EC) located outside its physical envelope and is thus capable of controlling, by virtue of the geometry and bending stiffness of the rods (16, 18), as well as of the geometry and bending stiffness of the connecting elements (20, 22) in the direction perpendicular to their plane, a second rotational degree of freedom (DOFθz) about a second, mainly vertical axis (ESAz).

8 Claims, 7 Drawing Sheets

U.S. PATENT DOCUMENTS

| | | | |
|---|---|---|---|
| 2,707,100 A * | 4/1955 | Schilberg | 267/254 |
| 2,734,753 A * | 2/1956 | Lind | 280/124.136 |
| 2,886,341 A * | 5/1959 | MacPherson | 280/124.134 |
| 3,883,152 A * | 5/1975 | De Carbon | 280/124.138 |
| 4,170,373 A * | 10/1979 | Beck et al. | 280/124.141 |
| 4,772,043 A | 9/1988 | Muramatsu | |
| 4,798,396 A * | 1/1989 | Minakawa | 280/124.138 |
| 4,810,004 A * | 3/1989 | Kanai et al. | 280/124.144 |
| 6,412,797 B1 * | 7/2002 | Park | 280/124.125 |
| 6,866,110 B2 * | 3/2005 | Mallette et al. | 180/183 |
| 7,506,882 B2 * | 3/2009 | Gerrard | 280/124.134 |
| 2003/0042699 A1 * | 3/2003 | Gerrard | 280/124.143 |
| 2004/0070129 A1 * | 4/2004 | Budde et al. | 267/188 |
| 2005/0110235 A1 * | 5/2005 | LeBlanc et al. | 280/124.135 |
| 2005/0127634 A1 * | 6/2005 | Gerrard | 280/124.143 |
| 2006/0290091 A1 * | 12/2006 | Gerrard | 280/124.145 |

FOREIGN PATENT DOCUMENTS

| | | |
|---|---|---|
| EP | 1 125 774 A2 | 8/2001 |
| EP | 1 288 028 A2 | 3/2003 |
| EP | 1 361 083 A2 | 11/2003 |
| JP | 02-099415 * | 4/1990 |
| JP | 02-102808 * | 4/1990 |

\* cited by examiner

ARM FOR A MOTOR-VEHICLE INDEPENDENT SUSPENSION AND MOTOR-VEHICLE INDEPENDENT SUSPENSION COMPRISING THE SAME

CROSS REFERENCE TO RELATED APPLICATION

This application is a National Stage of International Application No. PCT/IB2007/051152 filed Mar. 30, 2007, claiming priority based on Italian Patent Application No. TO2006A000246, filed Apr. 4, 2006, the contents of all of which are incorporated herein by reference in their entirety.

The present invention relates to a suspension arm for connecting a wheel-carrier to the body of a motor-vehicle in an independent suspension system, as specified in the preamble of claim 1.

A suspension arm of the above-identified type is known from European Patent Application EP1361083 in the name of the Applicant. This document discloses, with reference in particular to the embodiment illustrated in FIG. 4 thereof, an arm for a motorcar independent suspension comprising a pair of rods, each of which is formed by an essentially straight elongated central body, at the opposite, transversely inner and transversely outer ends of which respective cylindrical seats for articulation to the wheel-carrier and to the vehicle body, respectively, are attached. The two rods extend parallel to each other, substantially in the transverse direction of the vehicle, and are connected by a pair of flexible elements near the cylindrical seats. The flexible elements are characterized by a high ratio of the bending stiffness in a given direction to the bending stiffnesses in the directions perpendicular thereto. In particular, the flexible elements are made with a blade-like shape from a metal or composite sheet, so as to exhibit a high stiffness in their middle plane but a certain flexibility in the perpendicular direction to their middle plane. By virtue of such an arrangement, beyond the two translational degrees of freedom of the wheel-carrier along the axes of the two rods, the arm also constraints a third rotational degree of freedom of the wheel-carrier. The expression "cancel out a degree of freedom", as well as the equivalent expression "control a degree of freedom", are to be intended not in their literal meaning of impeding any displacement in the direction in question or rotation about the direction in question, but in their wider meaning of allowing displacements or rotations significantly smaller than the displacements or rotations allowed in the other directions.

In order better to understand the operation of the known suspension arm described above, as well as the one of the suspension arm of the present patent application, an explanation of the EEM (Equivalent Elastic Mechanism) technique proposed in the SAE Paper 2005-01-1719 will be given hereinafter. The EEM technique has been developed by the Applicant as an instrument for assisting in the design and analysis of the elasto-kinematic behaviour of motor-vehicle suspension systems. The EEM is a simple physical model capable of reproducing exactly and in full the linear elastic behaviour of any elastic system, in particular of a motorcar suspension.

Generally, to define the behaviour of a linear elastic system the stiffness matrix or the compliance matrix, which is the inverse of the stiffness matrix, are used. These matrices provide a very compact and mathematically elegant way of describing the behaviour of an elastic system, which may be also very complex, notwithstanding the location and the orientation of the forces or of the displacements applied to the system. The disadvantage of using these matrices resides however in that they are not very intuitive, since it is difficult to realize the actual behaviour of the system simply looking at the stiffness matrix thereof. For example, it is not possible to figure out from the stiffness matrix how the system might react to a displacement of the point of application or to a change in the orientation of a force acting on the system. Moreover, it is certainly impossible to realize from the stiffness matrix the effect of a change in the orientation or stiffness of one of the components of the elastic system in question.

The EEM technique aims at creating a physical model for representing a linear elastic system, which provides the same elastic behaviour as the one described by the stiffness matrix, which retain the typical advantage of the stiffness matrix represented by the independence from applied forces and imposed displacements, but which makes it possible to understand immediately and clearly the behaviour of the system as the parameters of that system and/or the forces and the displacements applied thereto vary.

The EEM can be split into two simple subsystems acting in series, each of which has three degrees of freedom and has its own system of local coordinates defining the orientation thereof. The first subsystem of the EEM is defined by three purely translational compliances (indicated hereinafter with the abbreviation TOC, which is the acronym of Translation-Only Compliance), which describe how the wheel-carrier translates without rotating along three axes perpendicular to each other. The TOC compliances and the orientation of the three axes of translation are calculated from the stiffness matrix of the original elastic system. The second subsystem of the EEM is defined by three elastic screw axes (indicated hereinafter with the abbreviation ESA, which is the acronym of Elastic Screw Axis) perpendicular to each other. To each elastic screw axis is associated one degree of freedom of elastic rototranslation consisting in a rotation about that axis and in a translation along that axis, the translation being univocally bound to the rotation. Also in this case, the position, the orientation and the compliances associated to the three ESA axes are calculated from the stiffness matrix of the original elastic system.

FIG. 1 of the attached drawings illustrates the application of the EEM technique to a suspension system of a wheel of a motor-vehicle. As can be seen from the figures, the model of the suspension consists in three axes of elastic rotation ESAx (oriented along the longitudinal direction of the vehicle or inclined by a certain angle relative to that direction), ESAy (oriented along the transverse direction of the vehicle or inclined by a certain angle relative to that direction) and ESAz (oriented along the vertical direction of the vehicle or inclined by a certain angle relative to that direction), and in three only-translation compliances TOCx (longitudinal translation), TOCy (transverse translation) and TOCz (vertical translation). W indicates a wheel of the vehicle, arrow F indicates the driving direction of the vehicle, and arrows IF, BF and CF indicate the impact force, the braking force and the steering force acting on the wheel W, respectively.

Once the compliances and the directions of the three ESA axes of the suspension have been calculated by decomposition of the stiffness matrix, the response of the suspension to the external forces applied thereto can be simply imagined by taking into account the combined effects of the force on each degree of freedom of translation or of elastic rotation about the respective ESA axis. Each ESA axis provides a complete description of the response of the wheel-carrier to a torque exerted about that axis. Since each torque exerted on the wheel-carrier can be decomposed in the three perpendicular directions of the subsystem defined by the ESA axes, the sum of the compliances relating to the three ESA axes of the elastic system constituted by the suspension provides a complete description of the elastic displacements of the system under the effect of an external torque applied to the system.

As mentioned above, all the elements of the EEM act in series and therefore the overall response of the system to an external force/torque is simply the sum of the deflections of each single element of the system under the effect of that force/torque.

A force applied to the TOC elements results in a pure translation which does not depend on the point of application of the force and usually has components in all the three directions of the first subsystem defined above, unless the applied force is parallel to one of these three direction. A torque applied to the TOC elements does not produce of course any deflection.

The effect of a force on the ESA axes is easy to envisage provided the direction of the force is approximately parallel to one of ESA axes. When the screwing effect are neglected, then no deflection of the ESA axis parallel to the force occurs. Accordingly, the force results simply in rotations about the other two ESA axes, which rotations depend on the rotational compliances of these axes and on the distance between the force and the ESA axes.

The rotational response of the system is thus simply given by the sum of the rotations about these two ESA axes. Each rotation also causes a deflection at the point of application of the force. The sum of the components of the deflections caused by the two rotations parallel to the applied force represents the translational compliance of the system at the point in question.

Finally, as the screwing effects are negligible, the application of a torque about one of the ESA axes results simply in a rotation about that axis, which rotation depends on the rotational compliance thereof.

For a deep understanding of the link among the parameters of the EEM model and the elasto-kinematic behaviour of the suspension under the lateral and longitudinal forces normally acting on the wheel of a motor-vehicle, reference is to be made to the above-cited non-patent publication.

Starting from the structure of the suspension arm known from the document cited at the beginning, it is therefore an object of the present invention to provide an arm for a motor-car independent suspension which is able to control one further degree of freedom of the wheel-carrier, for a totality of four degrees of freedom, without making the arm more complex and hence more expensive.

This object is fully achieved according to the present invention by virtue of a suspension arm having the characteristics set forth in the characterizing part of independent claim 1.

By virtue of the two rods converging towards the outside or the inside of the vehicle, the elastic centre (or traslazionale stiffness centre), and hence the axis ESAz, of the equivalent elastic system of the arm is arranged outside the envelope of the arm and the arm is therefore able to control the further degree of freedom of rotation about that axis. Since the rotation of the wheel-carrier about the axis ESAz causes the inflection of the flexible elements of the arm, the torsional stiffness associated with this axis is determined by the bending stiffnesses of the flexible elements.

Since the arm according to the invention controls four degrees of freedom of the wheel-carrier, it can be advantageously used as a lower transverse arm in combination with a camber control rod capable of controlling the remaining degree of freedom of the wheel-carrier, whereby a suspension having a simple structure, a low cost but high elasto-kinematic performances, can be obtained with only two components. As far as the economic advantages are concerned, it is sufficient to observe that a suspension adopting an arm according to the invention requires only six bushes (four for the lower arm and two for the camber control rod), instead of the eight bushes required in a suspension adopting an arm according to the prior art discussed above.

Preferred embodiments of a suspension arm according to the invention are specified in the dependent claims.

Preferably, the two rods of the suspension arm exhibit a certain compliance in torsion, whereas the articulation bushes are stiff. In this way, the rotation of the wheel-carrier under a braking torque is allowed by the torsional deformation of the rods. Alternatively, the two rods are stiff in torsion, whereas the bushes are flexible so that they allow a certain rotation of the wheel-carrier when a braking torque is applied.

The connecting elements are preferably formed as blade-like or plate-like elements, which might be hollow, so that they have a low bending stiffness in the direction perpendicular to their middle plane.

Alternatively, in case of an arm with rods which are stiff in torsion, the transversely outer flexible element can be formed by a bush.

The characteristics and the advantages of the invention will be better understood in the light of the following detailed description, given purely by way of non-limiting example, with reference to the attached drawings, in which.

In the description and the claims which follow, terms such as "longitudinal" and "transverse", "inner" and "outer", "front" and "rear", "horizontal" and "vertical", "upper" and "lower" are to be intended as referred to the mounting condition on the vehicle. Furthermore, according to the convention usually adopted in the automotive field, the longitudinal direction, the transverse direction and the vertical direction of the vehicle will be indicated x, y and z, respectively.

Figure 1:
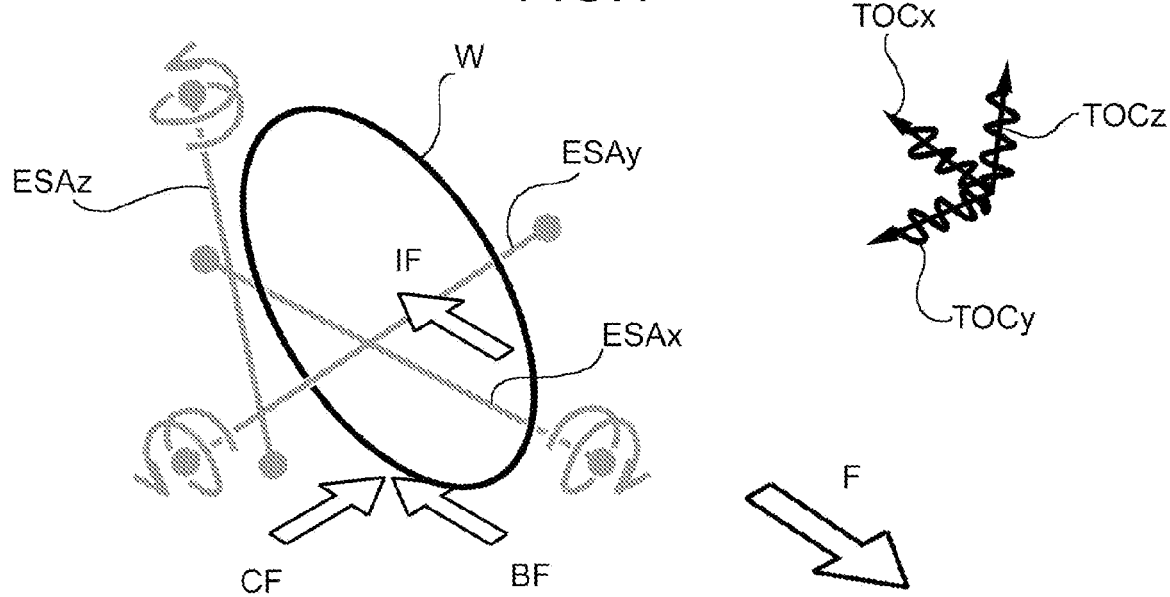
FIG. 1 is a scheme illustrating the application of the EEM technique to a suspension system for a motor-vehicle wheel.
Figure 2:
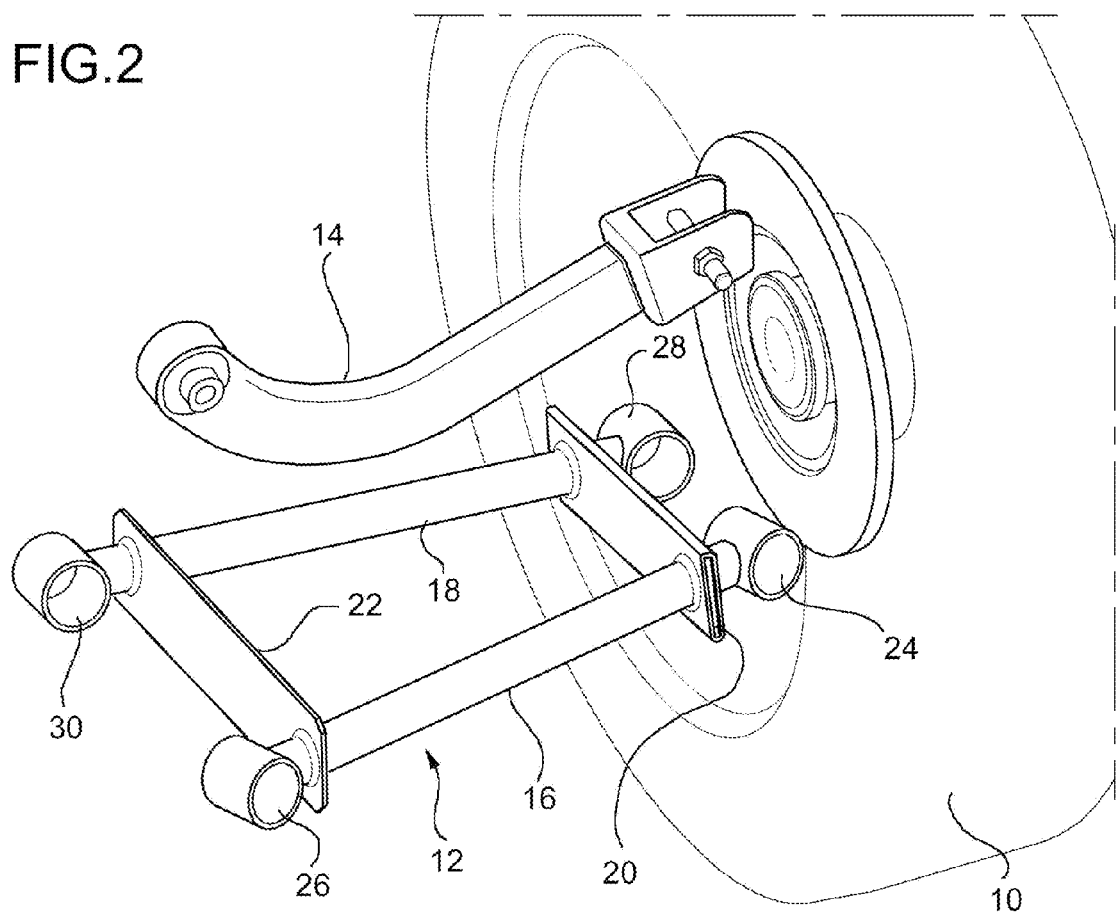
FIG. 2 is a perspective view of a motor-vehicle independent suspension including a suspension arm according to a preferred embodiment of the invention.

With reference first to FIG. 2, a motor-vehicle independent suspension for connecting the wheel-carrier (not shown) of a wheel 10 of the motor-vehicle to the body (also not shown) of the motor-vehicle comprises a lower arm, which is generally indicated 12, and a camber control rod 14. Both the arm 12 and the rod 14 are orientated transversely and articulated at their transversely outer ends to the wheel-carrier and at their transversely inner ends to the vehicle body. As can be noted for example from FIG. 3B, the points of articulation of the arm 12 are located in a substantially horizontal plane, as the points of articulation of the rod 14 are.

The arm 12 basically includes a pair of essentially straight rods 16 and 18, and a pair of connecting elements 20 and 22 which connect the rods 16 and 18 to one another at the outer and inner ends thereof, respectively.

According to a preferred embodiment of the invention, the rods 16 and 18 have an elongated body with a hollow cross-section, for example of circular shape. The rod 16 is provided at its transversely outer end with a first articulation seat 24 for receiving a first bush (not shown) for articulation to the wheel-carrier, and at its transversely inner end with a second articulation seat 26 for receiving a second bush (not shown) for articulation to the vehicle body. Likewise, the rod 18 is provided at its transversely outer end with a first articulation seat 28 for receiving a first bush (not shown) for articulation to the wheel-carrier, and at its transversely inner end with a second articulation seat 30 for receiving a second bush (not shown) for articulation to the vehicle body. In the illustrated embodiments, the articulation seats 24, 26, 28 and 30 are formed by hollow cylindrical elements attached in per-se-known manner (for example by welding) to the ends of the elongated bodies of the respective rods 16 and 18, their axes being preferably perpendicular to the axis of the elongated body and parallel to one another.

The connecting elements 20 and 22 are conceived in such a manner that they exhibit a high ratio of the stiffness in a given plane to the stiffness in a direction perpendicular to that plane. As shown in the embodiment of FIG. 2, the connecting elements 20 and 22 are advantageously formed as blade-like or plate-like elements from a sheet of metal or composite (or of any other material having adequate mechanical properties), so as to be substantially stiff in their middle plane but compliant in bending in a direction perpendicular to that plane.

Figure 6B:
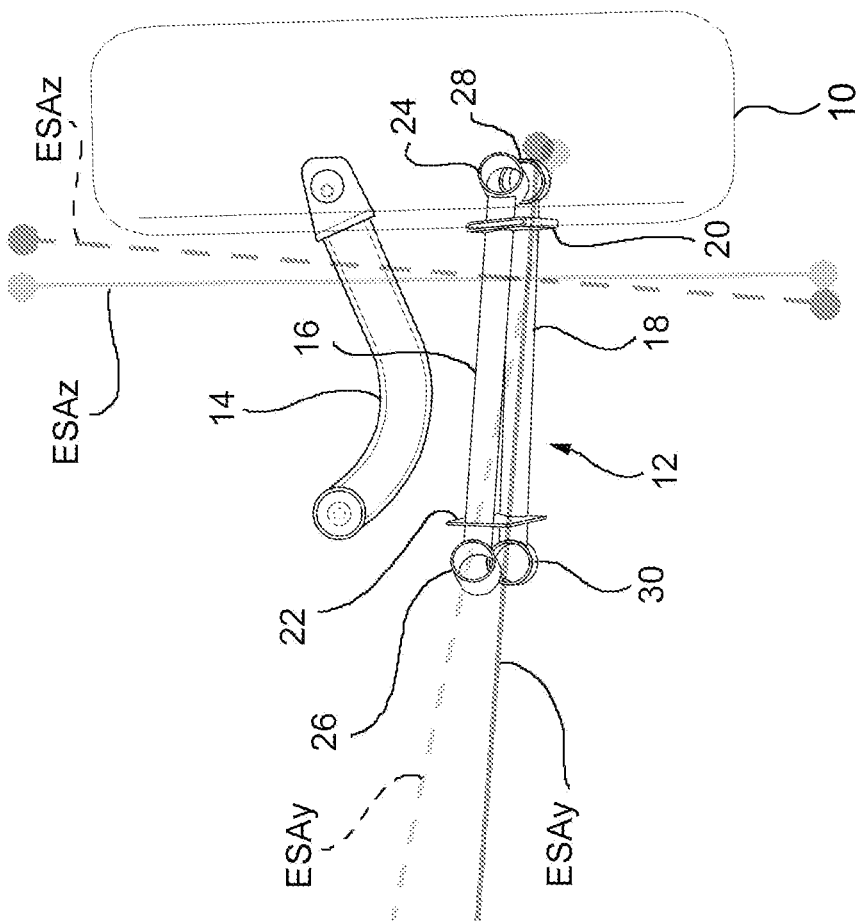
FIGS. 6A and 6B are front elevation view of the arm and of the suspension of FIG. 2, respectively, which illustrate how the orientation of the axes ESAy and ESAz varies as the orientation of the flexible elements of the arm varies.
Figure 6A:
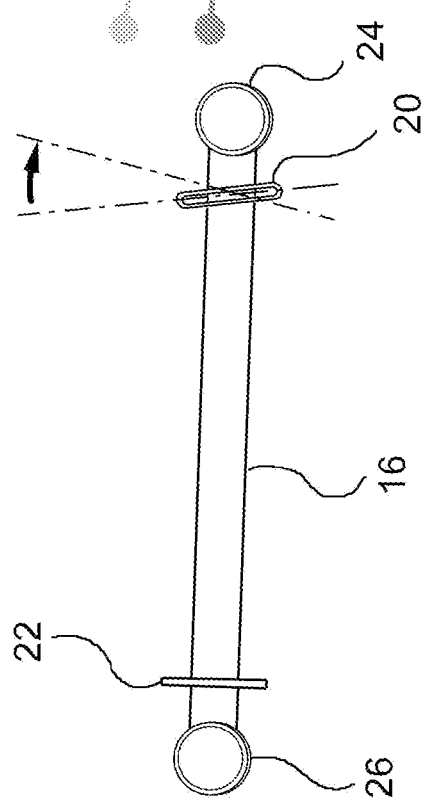

The connecting elements 20 and 22 can be arranged with their middle plane perpendicular to the axis of the elongated body of the rods 16 and 18 (see for instance the element 22 shown in FIG. 6A) or inclined to that axis (as the element 20 shown in FIG. 6A). As will be explained in the following part of the description, the inclination of the connecting elements 20 and 22 to the axes of the rods 16 and 18 affects the elastic properties of the arm 12 and hence the behaviour of the suspension.

The above-described suspension arm 12 is capable of "controlling" four degrees of freedom of the wheel-carrier, as any four point rigid suspension arm is, but does not exhibit the typical behaviour of a rigid arm due basically to two reasons.

First of all, the bending stiffness of the connecting elements and the torsional stiffness of the rods play a fundamental role in determining the elastic behaviour of the whole arm.

Figure 3A:
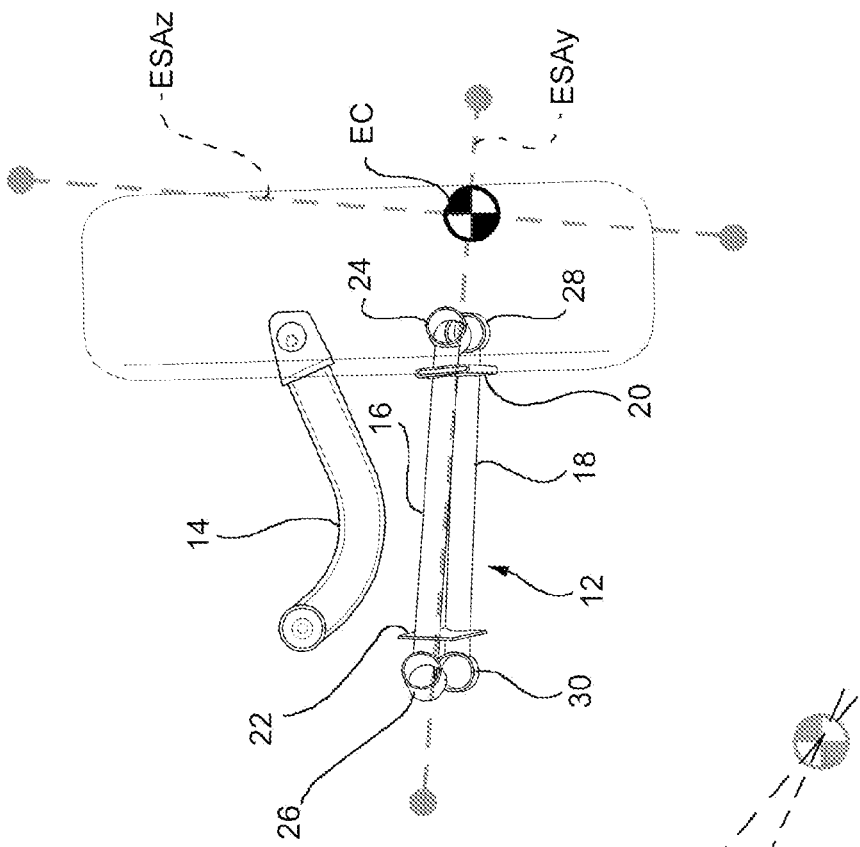
FIGS. 3A and 3B are a perspective view of the suspension arm of FIG. 2 and a front elevation view of the suspension of FIG. 2, respectively, which illustrate the arrangement of the two axes ESAy and ESAz of the equivalent elastic system associated with the suspension and how two translational degrees of freedom of the wheel-carrier are controlled.

Secondly, since the arm is not rigid, the elastic centre (also referred to a centre of translational stiffness) of the arm, which is located at the intersection of the two axes ESAy and ESAz of the equivalent elastic system associated with the arm, turns out to be outside the physical envelope of the arm itself, as indicated at EC in FIG. 3A. Such a position of the elastic centre could also be achieved with a rigid arm, but only if suitably orientated rubber bushes having a high ratio of the axial stiffness to the radial stiffness were used. The arm according to the invention, therefore, distinguishes itself from a conventional four point rigid arm in that it has such properties of structural flexibility that the elastic centre is moved outside the physical envelope of the arm, without having to rely on suitably orientated rubber bushes having a low stiffness in a given direction. On the contrary, the bushes of the arm according to the invention must be stiff enough in all the directions in order not to reduce the effect of moving the elastic centre outside the physical envelope of the arm, which effect is due to the structural compliance of the arm.

The four degrees of freedom of the wheel-carrier controlled by the suspension arm 12 will be described now with reference to FIGS. 3A-3B, 4A-4B and 5A-5B. These figures also show the arrangement of the elastic screw axes ESAy and ESAz of the arm, which are drawn in solid line or dashed line depending on the rotational compliance of the arm associated with these axes affecting the degree of freedom in question or not.

Figure 3B:
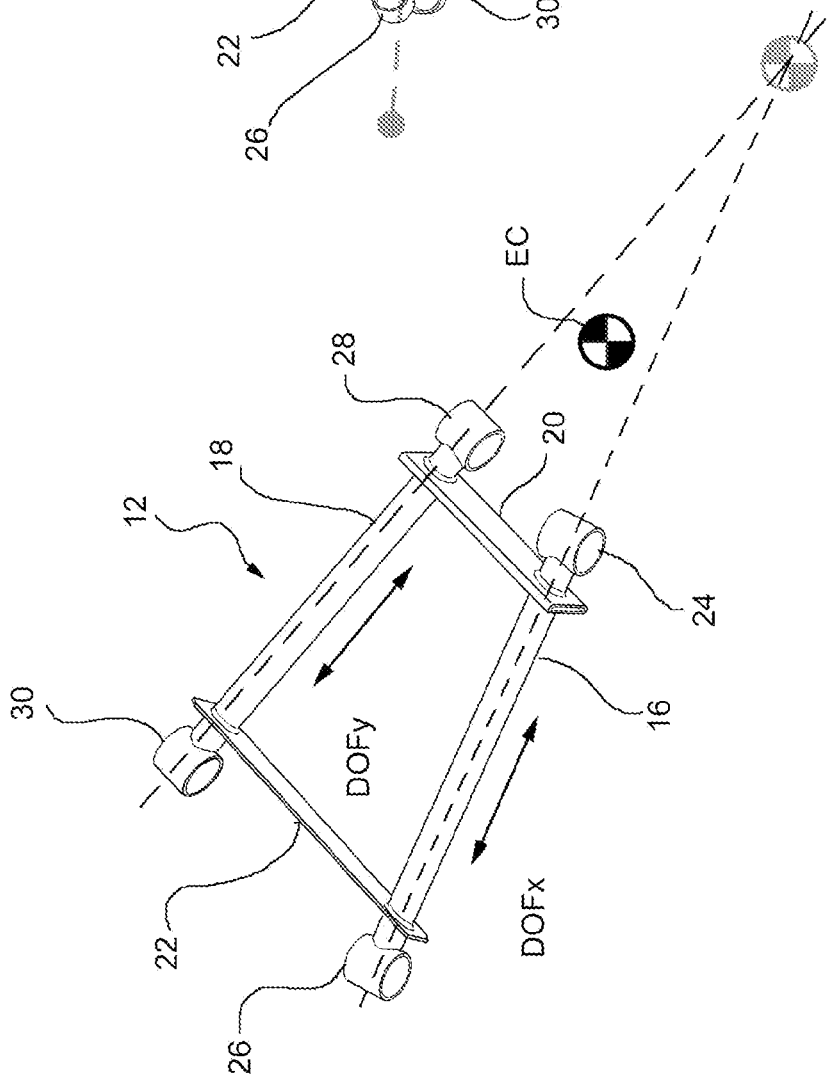

FIGS. 3A and 3B illustrate the two translational degrees of freedom controlled by the suspension arm 12. These two degrees of freedom are indicated DOFx and DOFy, respectively, and can be imagined either as translational degrees of freedom along the axes of the two rods 16 and 18, as illustrated in FIG. 3A, or as translational degrees of freedom along the longitudinal direction x and the transverse direction y of the vehicle. The stiffness of the arm 12 associated with the two translational degrees of freedom depends on the axial stiffness of the two rods 16 and 18 in series with the stiffness of the bushes in the axial direction of the rods. The higher those stiffnesses are, the farther the elastic centre EC of the arm 12 is from the arm.

Figure 4B:
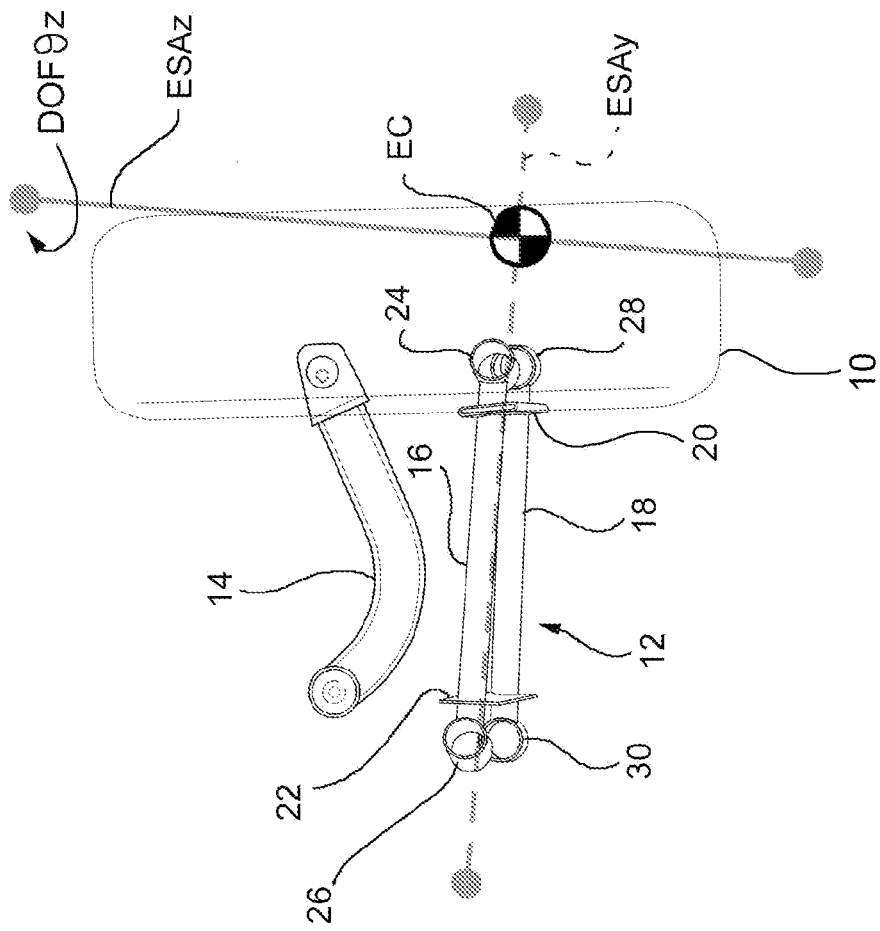
FIGS. 4A and 4B are a plane view of the suspension arm of FIG. 2 and a front elevation view of the suspension of FIG. 2, respectively, which illustrate the behaviour of the arm with respect to the axis ESAz.
Figure 4A:
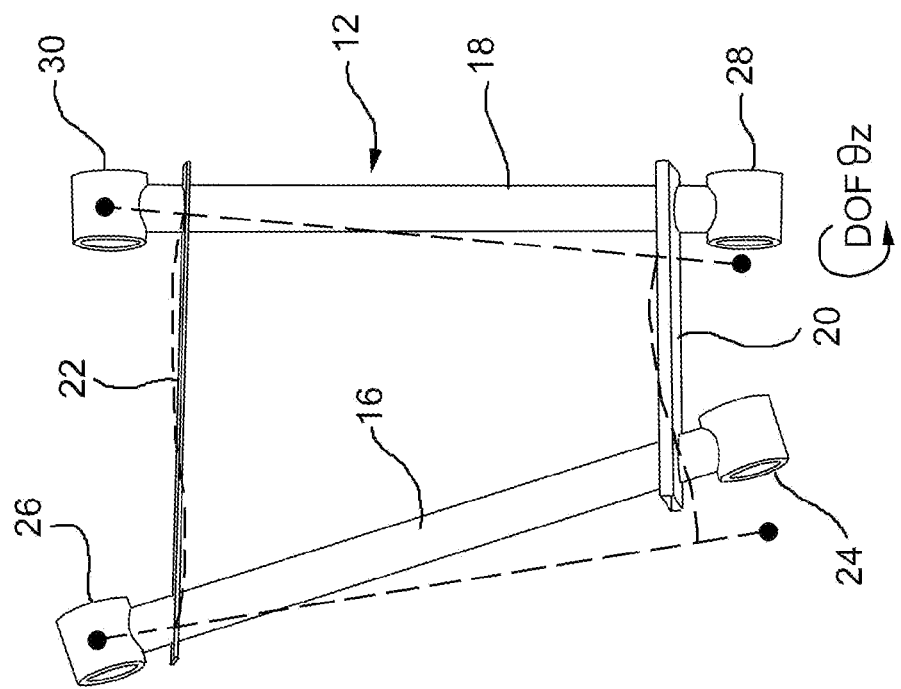

With reference to FIGS. 4A and 4B, the third degree of freedom controlled by the arm 12 is indicated DOFθz and is a rotational degree of freedom about the axis ESAz due to the bending deformation of the flexible connecting elements 20 and 22, as shown in dashed line in FIG. 4A. The rotational stiffness of the arm 12 about the axis ESAz depends on the bending stiffness of the connecting elements 20 and 22 in the direction of their highest flexibility, which is located in the illustrated example in an approximately horizontal plane, since the middle planes of these elements are approximately vertical. The rotational stiffness of the arm 12 about the axis ESAz also depends on the stiffness of the bushes in the horizontal plane and in a direction perpendicular to the axes of the rods 16 and 18, as well as on the bending stiffness of the rods themselves.

Figures 5A, 5B:
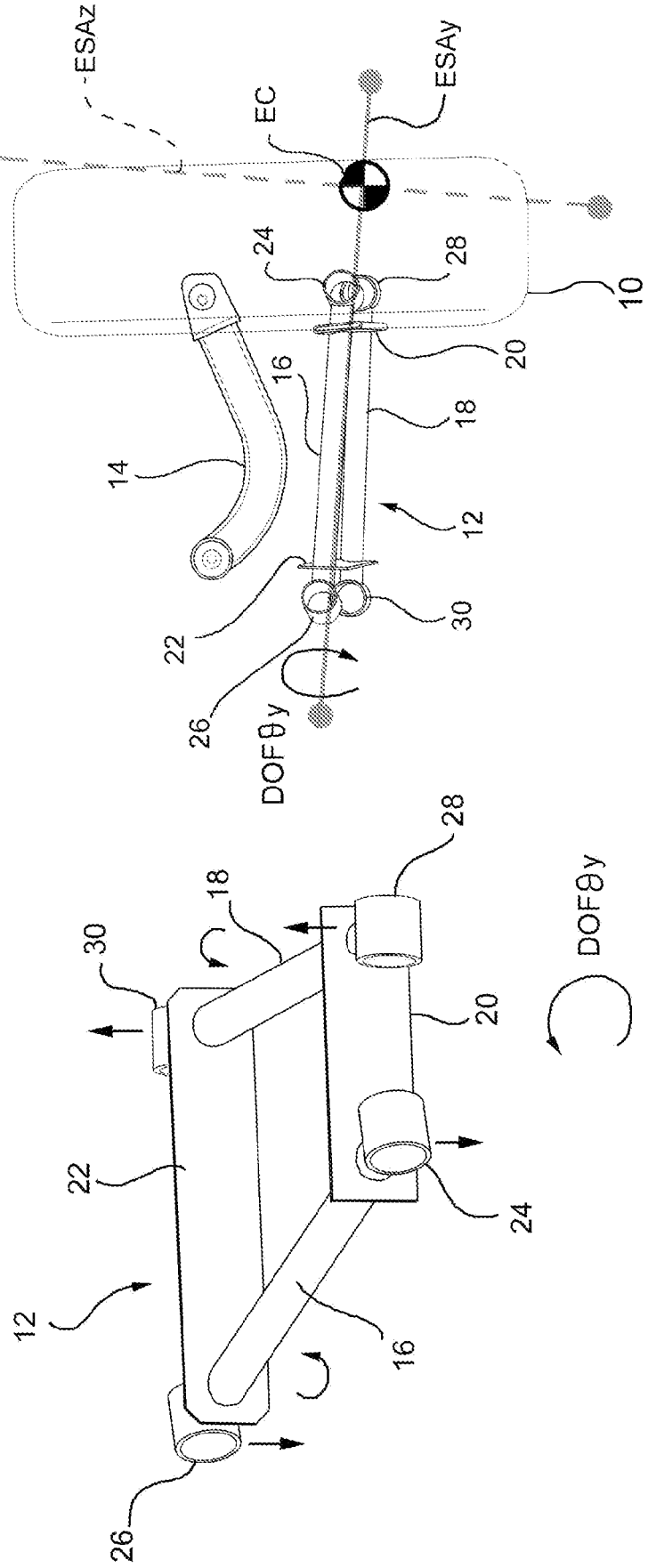
FIGS. 5A and 5B are a perspective view of the suspension arm of FIG. 2 and a front elevation view of the suspension of FIG. 2, respectively, which illustrate the behaviour of the arm with respect to the axis ESAy.

With reference to FIGS. 5A and 5B, the fourth degree of freedom controlled by the arm 12 is indicated DOFθy and is a rotational degree of freedom about the axis ESAy. The rotational stiffness of the arm 12 about the axis ESAy depends on the bending stiffness of the connecting elements 20 and 22 in their direction of greatest stiffness, which in the illustrated example lays in an approximately vertical plane. The rotational stiffness of the arm 12 about the axis ESAy also depends on the stiffness of the bushes in the vertical plane, as well as on the torsional stiffness of the portions of rods 16 and 18 between the connecting elements 20 and 22.

The location of the elastic centre EC of the suspension arm 12 depends on the above-mentioned stiffness characteristics in the horizontal plane. The more the rotational stiffness of the arm 12 about the axis ESAz tends to zero, that is to say, the more the connecting elements 20 and 22 are infinitely thin and flexible (in other words, have a high ratio of the bending stiffness in their middle plane to the bending stiffness in a direction perpendicular to their middle plane), the more the elastic centre EC tends to be close to the theoretical position corresponding to the geometrical intersection of the axes of the two rods 16 and 18.

The behaviour of the suspension arm 12 is between the behaviour of a four point rigid arm and that of a pair of separate connecting rods, depending on the bending stiffness of the connecting elements 20 and 22. As the torsional stiffness about the axis ESAz decreases, the behaviour of the arm tends to become that of two separate connecting rods, whereas as the torsional stiffness about the axis ESAz increases the behaviour of the arm tends to become that of a four point rigid arm.

The orientation of the axes ESAy and ESAz of the equivalent elastic system associated with the suspension arm 12 is mainly determined by the orientation of the arm itself, that is, of the rods 16 and 18, and secondarily by the orientation of the connecting elements 20 and 22. In this connection, FIGS. 6A and 6B show how the orientation of the two axes ESAy and ESAz vary as a result of a variation in the angle between the middle plane of the outer connecting element 20 and the middle plane on which the two rods 16 and 18 rest.

Figure 7:
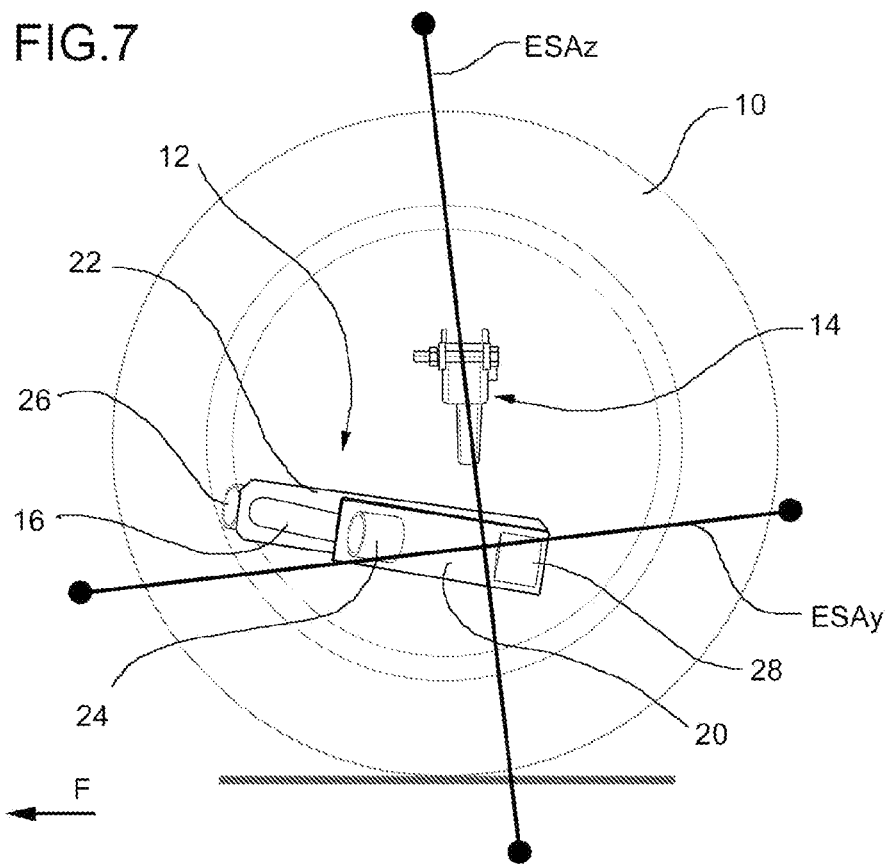
FIG. 7 is a side elevation view of the suspension of FIG. 2, which shows the orientation of the axis ESAz in the plane x-z of the vehicle.

On the other hand, FIG. 7 shows how the inclination of the axis ESAz in the plane x-z, that is, in a longitudinal vertical plane, is determined also by the position of the camber control rod 14. Preferably, the axis ESAz is selected such that it is arranged behind the wheel centre with respect to the driving direction of the vehicle (indicated by arrow F in FIG. 7).

Furthermore, where rods are used which have a non-axially symmetric cross-section, for example plate-like or blade like rods, also the orientation of the rods affects those of the two axes ESAy and ESAz.

Figure 8:
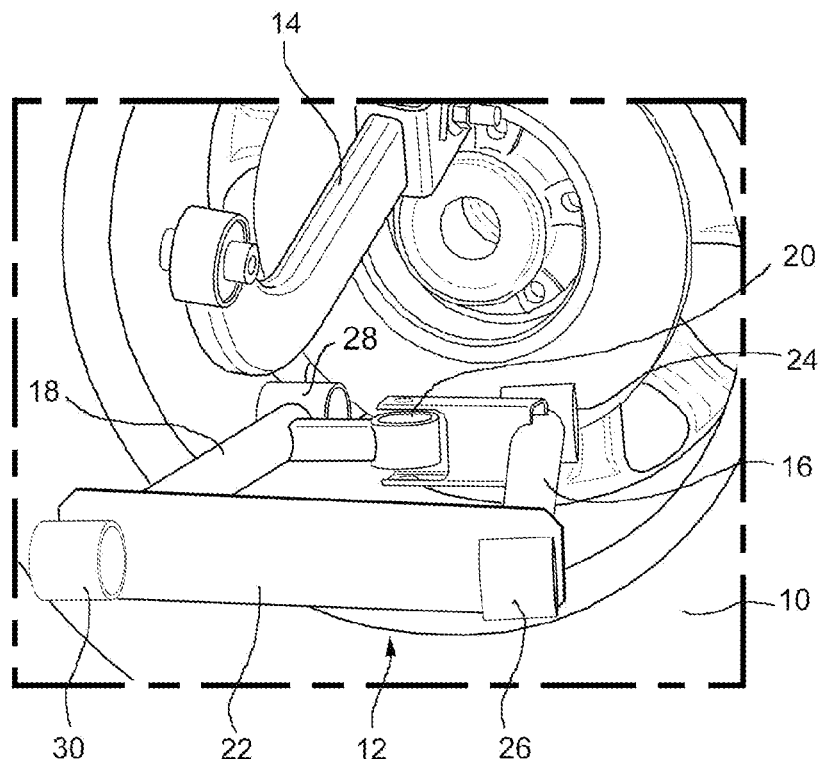
FIG. 8 is a perspective view of a motor-vehicle independent suspension including a suspension arm according to a variant of embodiment of the present invention.

A variant of the suspension arm according to the invention is illustrated in FIG. 8, where parts and elements identical or corresponding to those of FIGS. 2 to 7 have been given the same reference numerals. This variant differs from the previously described embodiment substantially in that the outer connecting element 20 is here formed not by a plate-like or blade-like element, but by a bush, the orientation of which can be changed to vary the orientation of the axes ESAy and ESAz of the arm.

As will be understood in the light of the previous description, the main advantage of a suspension arm according to the invention does not consist so much in the absolute position of the elastic centre thereof as in the possibility to define with a wide freedom of choice, at the design stage, the most appropriate position of the elastic centre in view of the object to meet the required elasto-kinematic specifications of the suspension. By suitably defining the geometry and the stiffness characteristics of the components of the arm, that is, of the rods and of the connecting elements, it is in fact possible to obtain the desired position of the elastic centre and the desired orientation of the axes ESAy and ESAz of the equivalent mechanical system associated with the arm.

Naturally, the principle of the invention remaining unchanged, the embodiments and the constructional details may vary widely with respect to those described and illustrated purely by way of a non-limiting example.

For example, even though a configuration of the arm in which the two rods converge towards the outside of the vehicle is held to be preferable, it is also suitable a configuration in which the rods converge towards the inside of the vehicle.

Moreover, the connecting elements can have either an open cross-section (for example, blade-like of plate-like elements) or a closed cross-section (for example, tubular elements).

Even if in most of the applications a vertical or substantially vertical arrangement of the connecting elements is preferable, because in this case the bending stiffness in the vertical plane is significantly greater than that in the horizontal plane, any other orientation of those elements clearly falls within the scope of the present invention.

Likewise, even if the use of connecting elements having a high ratio of the bending stiffnesses in the two orthogonal direction is preferable, connecting elements might also be used which do not have a high ratio of the stiffnesses in the two orthogonal directions, should the suspension meet particular elasto-kinematic specifications.

Moreover, in case of blade-like or plate-like connecting elements either a pair of connecting elements of great thickness can be used or alternatively each connecting element can be replaced by a plurality of connecting elements of small thickness, in order to obtain a better stress distribution in the arm.

The cross-section of the rods can have any suitable shape. For instance, blade-like rods can be used, which have either an open cross-section or a hollow cross-section, in such a manner that also their orientation can be used as a parameter for defining the orientation of the ESA axes of the arm.

Also the position of the connecting elements at the opposite ends of the rods is to be considered as non-limiting.

Moreover, it is not necessary that the four points for articulation of the arm to the wheel-carrier and to vehicle body are located in the same plane.

Finally, the structure formed by rods and flexible blade-like elements as illustrated in the description and in the figures could be obtained, from a technological point of view, by welding of stamped pieces with cross-sections suitably shaped and dimensioned to have the required stiffness characteristics. Especially in case of rods made as stamped pieces, a spring support element could be advantageously formed as a single piece with one of the rods.

The invention claimed is:

1. Arm for a motor-vehicle independent suspension, for connecting the wheel-carrier of a vehicle wheel to the vehicle body, the arm comprising a pair of transverse rods articulated at their transversely outer ends to the wheel-carrier and at their transversely inner ends to the vehicle body, and at least one pair of connecting elements which connect the rods to one another and are formed such that they have a bending stiffness in a plane greater than the bending stiffness in a direction perpendicular to said plane, the arm being capable of controlling two translational degrees of freedom along the axes of the rods and, by virtue of the geometry and the torsional stiffness of the rods, as well as of the geometry and bending stiffness of the connecting elements in said plane, a first rotational degree of freedom about a first, mainly transverse and horizontal axis, wherein the rods converge in such a manner that the arm has an elastic centre located outside its physical envelope and is thus capable of controlling, by virtue of the geometry and bending stiffness of the rods, as well as of the geometry and bending stiffness of the connecting elements in the aforesaid low-stiffness perpendicular direction, a second rotational degree of freedom about a second, mainly vertical axis and wherein at least one of said connecting elements is formed by a bush, the orientation of which affects the orientation of said first and second axis.

2. Arm according to claim 1, wherein the rods are mainly horizontal.

3. Arm according to claim 1, wherein each rod has an essentially straight, elongated body provided at its transversely outer end with a first articulation seat for receiving a first bush for articulation to the wheel-carrier and at its transversely inner end with a second articulation seat for receiving a second bush for articulation to the vehicle body.

4. Arm according to claim 3, wherein said articulation seats are formed by hollow cylindrical elements attached to the ends of the elongated body of their respective rods, the axes of these seats being substantially perpendicular to the axis of the elongated body.

5. Arm according to claim 1, wherein the cross-section of the rods is non-axially symmetric, whereby the orientation of the rods affects that of said first and second axis.

6. Arm according to claim 1, wherein at least another one of said connecting elements is a mainly flat element, so as to be substantially stiff in its plane but compliant in bending in a direction perpendicular to that plane.

7. Arm according to claim 6, wherein said mainly flat element extends in a vertical plane.

8. Motor-vehicle independent suspension comprising an arm according to claim 1 as a lower transverse arm and a camber control rod.

* * * * *